(12) United States Patent
Sonderegger et al.

(10) Patent No.: US 10,578,249 B2
(45) Date of Patent: Mar. 3, 2020

(54) GAS TANK ARRANGEMENT

(71) Applicant: VOLVO TRUCK CORPORATION, Göteborg (SE)

(72) Inventors: Sigurd Sonderegger, Askim (SE); Lena Larsson, Västra Frölunda (SE)

(73) Assignee: VOLVO TRUCK CORPORATION, Göteborg (SE)

( * ) Notice: Subject to any disclaimer, the term of this patent is extended or adjusted under 35 U.S.C. 154(b) by 21 days.

(21) Appl. No.: 15/775,484

(22) PCT Filed: Dec. 14, 2015

(86) PCT No.: PCT/EP2015/079604
§ 371 (c)(1),
(2) Date: May 11, 2018

(87) PCT Pub. No.: WO2017/101968
PCT Pub. Date: Jun. 22, 2017

(65) Prior Publication Data
US 2018/0372273 A1    Dec. 27, 2018

(51) Int. Cl.
*F17C 7/04*    (2006.01)
*B60K 15/03*    (2006.01)
(Continued)

(52) U.S. Cl.
CPC ............... *F17C 7/04* (2013.01); *B60K 15/03* (2013.01); *F02M 21/0224* (2013.01);
(Continued)

(58) Field of Classification Search
CPC ........ F17C 7/02; F17C 7/04; F17C 2221/032; F17C 2221/033; F17C 2221/035;
(Continued)

(56) References Cited

U.S. PATENT DOCUMENTS

| 2,035,396 A | 3/1936 | Mesinger |
| 5,351,487 A | 10/1994 | Abdelmalek |

(Continued)

FOREIGN PATENT DOCUMENTS

| CN | 1261430 A | 6/2006 |
| CN | 102431432 A | 5/2012 |

(Continued)

OTHER PUBLICATIONS

International Search Report (dated Jun. 13, 2016) for corresponding International App. PCT/EP2015/079604.
(Continued)

*Primary Examiner* — Erick R Solis
(74) *Attorney, Agent, or Firm* — Withrow & Terranova, PLLC

(57) ABSTRACT

A gas tank arrangement for an internal combustion engine is provided, the gas tank arrangement including a gas tank configured to contain a combustible gas, and a first additional gas tank positioned in downstream fluid communication with the gas tank, wherein the gas tank arrangement further includes a second additional gas tank positioned in downstream fluid communication with the gas tank and in upstream fluid communication with the first additional gas tank. A vehicle including such a gas tank arrangement is also provided.

17 Claims, 3 Drawing Sheets

(51) Int. Cl.
*F17C 7/00* (2006.01)
*F02M 21/02* (2006.01)
*F02M 21/06* (2006.01)
*B60K 25/00* (2006.01)

(52) U.S. Cl.
CPC ............... *F02M 21/06* (2013.01); *F17C 7/00* (2013.01); *B60K 25/00* (2013.01); *B60K 2015/03138* (2013.01); *B60K 2015/03144* (2013.01); *B60K 2015/03256* (2013.01); *B60K 2015/03309* (2013.01); *F02M 21/0215* (2013.01); *F17C 2201/056* (2013.01); *F17C 2205/0326* (2013.01); *F17C 2205/0332* (2013.01); *F17C 2221/012* (2013.01); *F17C 2221/033* (2013.01); *F17C 2223/0161* (2013.01); *F17C 2227/0135* (2013.01); *F17C 2227/0383* (2013.01); *F17C 2227/0393* (2013.01); *F17C 2250/01* (2013.01); *F17C 2265/066* (2013.01); *F17C 2270/0171* (2013.01); *Y02E 60/321* (2013.01)

(58) Field of Classification Search
CPC ...... F17C 2223/0153; F17C 2223/0161; F17C 2227/0135; F17C 2227/0393; F17C 2250/01; F17C 2260/044; F17C 2265/066; F17C 2270/0168; F17C 2270/0171; F17C 2270/0173; F17C 2270/0176; F17C 2270/0178
USPC .................................................. 123/527, 529
See application file for complete search history.

(56) References Cited

U.S. PATENT DOCUMENTS

| | | | |
|---|---|---|---|
| 5,421,160 A | | 6/1995 | Gustafson et al. |
| 5,685,159 A | * | 11/1997 | Kooy .................. F17C 6/00 138/26 |
| 5,699,839 A | * | 12/1997 | Dehne .................. F17C 6/00 141/18 |
| RE35,874 E | * | 8/1998 | Neeser .................. F17C 9/00 123/525 |
| 5,884,488 A | * | 3/1999 | Gram .................. F04B 15/08 417/901 |
| 9,163,785 B2 | * | 10/2015 | Mackey .................. F17C 13/02 |
| 10,323,794 B2 | * | 6/2019 | Leachman .............. F17C 5/06 |
| 2012/0156059 A1 | * | 6/2012 | Watts .................. F17C 5/06 417/53 |
| 2014/0137572 A1 | * | 5/2014 | Steffen .................. F17C 7/04 62/48.1 |

FOREIGN PATENT DOCUMENTS

| | | |
|---|---|---|
| CN | 103620202 A | 3/2014 |
| CN | 103822091 A | 5/2014 |
| CN | 104121479 A | 10/2014 |
| CN | 104390133 A | 3/2015 |
| CN | 104590007 A | 5/2015 |
| EP | 2659120 B1 | 12/2014 |

OTHER PUBLICATIONS

The First Office Action for Chinese Patent Application No. 201580084764.6, dated Dec. 18, 2019, 16 pages.

* cited by examiner

GAS TANK ARRANGEMENT

BACKGROUND AND SUMMARY

The present invention relates to a gas tank arrangement for an internal combustion engine. The invention also relates to a vehicle comprising such a gas tank arrangement. The invention is applicable on vehicles, in particularly low, medium and heavy duty vehicles commonly referred to as trucks. Although the invention will mainly be described in relation to a truck it may also be applicable for other types of vehicles such as e.g. working machines, cars, etc.

In relation to propulsion systems for heavy duty vehicles, internal combustion engines are frequently used. These internal combustion engines are most often propelled by a combustible fuel such as e.g. diesel or petrol. However, in order to further reduce engine emissions of the vehicles, alternative propulsion methods and/or fuels are being used, either alone or in combination with the well known combustible fuels. These may include, for example, ethanol or electrical propulsion from an electric machine, etc.

As a further alternative, a combustible gas, such as e.g. compressed natural gas, DME, biogas, etc. has been found a suitable propulsion fuel for vehicles in the form of trucks. The combustible gas can be used, either alone or in combination with a combustible fuel/liquid, for propelling the internal combustion engine. Since the residuals from the combustible gas are relatively environmentally friendly in comparison to e.g. combustible fuels, pollution from the emissions thereof are reduced for these types of engines.

A problem with engines being propelled by the above described combustible gas is that if leakage of gas occurs from e.g. the gas tank or other positions of the system prior to combustion thereof, there is a risk of green house gas emission pollution. Unwanted leakage of this kind also has an economical aspect since the fuel consumption will increase. There is thus a need to further improve the gas tank arrangements for these internal combustion engines.

It is desirable to provide a gas tank arrangement which at least partially overcomes the deficiencies of the prior art.

According to a first aspect of the present invention, there is provided a gas tank arrangement for an internal combustion engine, the gas tank arrangement comprising a gas tank configured to contain a combustible gas, and a first additional gas tank positioned in downstream fluid communication with the gas tank, wherein the gas tank arrangement further comprises a second additional gas tank positioned in downstream fluid communication with the gas tank and in upstream fluid communication with the first additional gas tank.

The wording "combustible gas" should in the following and throughout the entire description be interpreted as a gas which can be ignited, either self-ignited by compression or be ignited by e.g. a spark plug. The invention should thus not be limited to any specific combustible gas. However, as a non-limiting example, the combustible gas may be natural gas, which is described further below. Other alternatives are also conceivable such as e.g. H2, DME, biogas, gaseous hydrocarbons, etc. The combustible gas can be in liquid phase and in gas phase. Hence, the wording "combustible gas" should be interpreted to include liquefied gas as well as gas in gas phase.

An advantage of the present invention is that the fuel consumption of the internal combustion engine is improved. The reason is that prior to refill of the gas tank, the pressure level of the gas tank can be reduced by delivery of combustible gas to the second additional gas tank instead of venting the gas tank and deliver excess gas to e.g. the tank station or to the ambient environment. Hence, substantially all the combustible gas in the gas tank can be delivered to the internal combustion engine for combustion thereof during operation of the vehicle. Accordingly, excess gas can be delivered to the second additional gas tank when venting the gas tank. The gas tank arrangement is thus more environmentally friendly since excess gas from the gas tank can be stored in the second additional gas tank instead of ventilation to the ambient environment. The energy efficiency is also improved since the fuel consumption will be reduced. The first and second additional gas tanks may thus be arranged downstream the gas tank by means of separate conduits.

According to an example embodiment, the first additional gas tank may be configured to be positioned in upstream fluid communication with the internal combustion.

Hereby, combustible gas is provided to the internal combustion engine from the first additional gas tank. The first additional gas tank may be arranged in fluid communication with a fuel injection system of the internal combustion engine as will be described further below.

According to an example embodiment, the gas tank arrangement may comprise a compressor positioned in fluid communication between the first and second additional gas tanks.

The compressor may be arranged to compress combustible gas in gas phase into high pressure combustible gas in gas phase, which high-pressure gas is delivered to the first additional gas tank. Hereby, the second additional gas tank can be arranged as a low pressure gas tank adapted to contain combustible gas having a relatively low pressure level in comparison to the pressure level of the combustible gas in the first additional gas tank.

According to an example embodiment, the compressor may be a mechanically driven gas compressor connectable to the internal combustion engine.

The gas compressor may be connected to the internal combustion engine via e.g. an engine power take off system or a gearbox power take off system of the vehicle. An advantage is that the gas compressor can be propelled by means of brake energy from the vehicle. Accordingly, the mechanically controlled gas compressor can be energized by utilizing the kinetic energy of the vehicle driveline.

According to an example embodiment, the compressor may be an electrically driven gas compressor.

An electrically driven gas compressor is beneficial in situations where the vehicle is driven at relatively long straight ahead roadways where no braking action is likely to occur, or the vehicle is less likely to be driven downhill for regeneration of energy. An electrically driven gas compressor is also beneficially used when the vehicle is standing still during, for example, refill of the gas tank. An electrically controlled gas compressor can be beneficial since there is further freedom at which position of the vehicle it can be arranged.

According to an example embodiment, the gas tank arrangement may further comprise a valve positioned in fluid communication between the first and second additional gas tanks, wherein the first additional gas tank is positioned in upstream fluid communication with the second additional gas tank via the valve.

Hereby, combustible gas is allowed to be controllably delivered from the first additional gas tank back to the second additional gas tank. This may be beneficial in cases when the gas pressure in the first addition gas tank exceeds a maximum allowable pressure limit. In such case, the first additional gas tank can be vented by positioning the valve in an open position to allow combustible gas to be delivered back to the second additional gas tank. Hence, the valve may be arranged at a separate conduit between the first and second additional gas tanks, i.e. two conduits may be arranged between the first and second additional gas tanks. A further advantage of the valve is that it enables for an open conduit back to the second additional gas tank when, for example, the engine is shut off and there is a desire to reduce the pressure in the conduits of the gas tank arrangement. The valve may be an electrically controlled valve or a pressure relief valve.

According to an example embodiment, the gas tank arrangement may comprise a gas converter arrangement arranged to convert liquefied combustible gas to compressed combustible gas, the gas converter arrangement being positioned in fluid communication between the gas tank and the first additional gas tank.

Hereby, the combustible gas can be provided in liquid phase from the gas tank and thereafter converted into pressurized gas phase before being delivered to the first additional gas tank. The pressurized gas is suitable for delivery to a fuel injection system of the internal combustion engine.

According to an example embodiment, the gas converter arrangement may comprise a fuel pump and an evaporating unit positioned in downstream fluid communication with the fuel pump.

The fuel pump thus transports/delivers the liquid combustible gas to the evaporating unit, which compresses and converts the liquefied combustible gas into compressed combustible gas in gas phase prior to delivery to the first additional gas tank.

According to an example embodiment, the gas tank arrangement may comprise a first conduit arranged between the gas tank and the second additional gas tank.

According to an example embodiment, the gas tank arrangement may comprise a pressure relief valve arranged in the first conduit between the gas tank and the second additional gas tank.

Hereby, when the pressure in the gas tank exceeds a predetermined pressure level, the pressure relief valve is positioned in an open state to allow combustible gas to be delivered from the gas tank to the second additional gas tank. The pressure relief valve is thus controlled by means of the gas pressure in the gas tank. The pressure increase in the gas tank may be caused by e.g. a rise in gas tank temperature, etc.

According to an example embodiment, the gas tank arrangement may comprise a second conduit arranged between the gas tank and the second additional gas tank.

Accordingly, the first and second conduits are separate conduits. The gas tank and the second additional gas tank may thus, according to an example, be connected to each other by means of two separate conduits.

According to an example embodiment, the gas tank arrangement may comprise an electrically controlled valve arranged in the second conduit between the gas tank and the second additional gas tank.

Hereby, delivery of combustible gas from the gas tank to the second additional gas tank may be controlled by means of the electrically controlled valve. Combustible gas may thus be delivered to the second additional gas tank at situations other than when the gas pressure level of the gas tank exceeds a maximum threshold limit. The electrically controlled valve may, for example, be controlled to be positioned in an open state before the vehicle operator intends to refuel the gas tank. Hereby, excess gas in the gas tank is controllably delivered to the second additional gas tank, thus more combustible gas can be provided to the gas tank when refueling. Still further, a higher fill velocity of the second additional gas tank may be obtained by means of positioning both the electrically controlled valve and the pressure relief valve in an open state.

According to an example embodiment, the first additional gas tank may be a high pressure gas vessel configured to contain compressed combustible gas adapted to be delivered to a fuel injection system of the internal combustion engine.

Hereby, a storage tank for high-pressure combustible gas is provided which can deliver high-pressure combustible gas to the fuel injection system of the internal combustion engine when desired.

According to an example embodiment, the gas tank and the second additional gas tank may be configured to contain combustible gas of substantially similar pressure levels.

An advantage is that there is no need to pressurize the combustible gas before delivery to the second additional gas tank. Still further, if the gas pressure level of the second additional gas tank is slightly lower than the gas pressure level in the gas tank, there is no need to provide a pump or the like between the gas tank and the second additional gas tank for delivery of gas from the gas tank to the second additional gas tank, due to the difference in pressure levels.

According to an example embodiment, the combustible gas may be natural gas. Natural gas is a well known combustible gas which, at present, can be provided at a plurality of gas stations.

According to a second aspect of the present invention, there is provided a vehicle comprising an internal combustion engine and a gas tank arrangement according to any of the above described example embodiments of the first aspect of the present invention, wherein the internal combustion engine is arranged downstream the gas tank arrangement.

According to an example embodiment, the internal combustion engine may be a dual fuel internal combustion engine.

A dual fuel internal combustion engine should be understood to mean a combustion engine which can be propelled by both a combustible gas and a combustible fuel, or a mixture thereof. The combustible fuel may, for example, be diesel or petrol. However, the present invention should not be construed as limited to any specific alternative.

Further effects and features of this second aspect are largely analogous to those described above in relation to the first aspect of the present invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional features and advantages of the present invention, will be better understood through the following illustrative and non-limiting detailed description of exemplary embodiments of the present invention, wherein.

DETAIL DESCRIPTION

Figure 1:
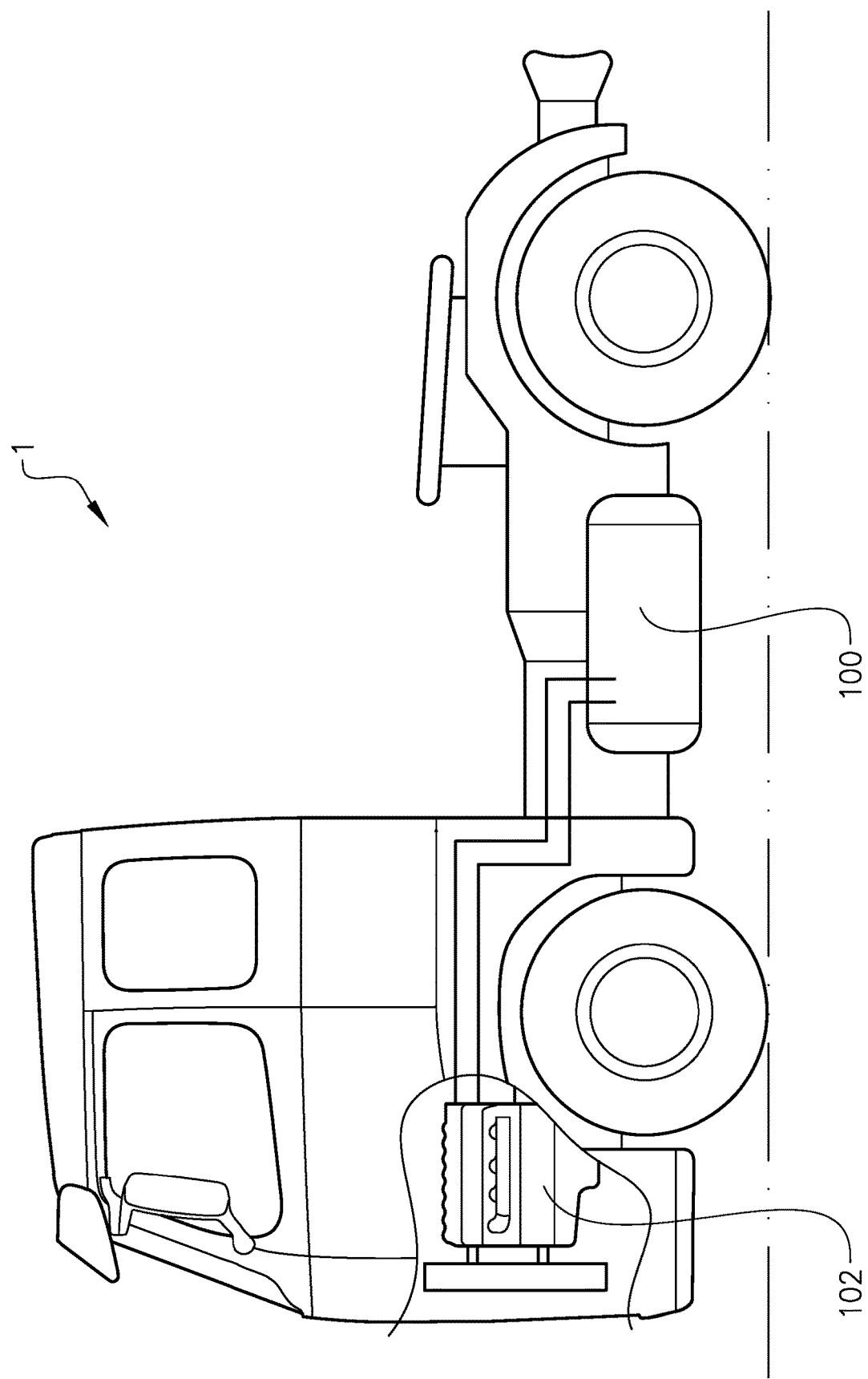
FIG. 1 is a side view of a vehicle according to an example embodiment of the present invention.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is provided a vehicle 1 comprising an internal combustion engine 102. The internal combustion engine 102 may be an internal combustion engine solely propelled by a combustible gas, such as e.g. compressed natural gas, DME, biogas, etc. or a dual fuel internal combustion engine which is connected to a fuel tank and to a gas tank arrangement 100, and thus propelled by both the combustible gas and a conventional fuel such as e.g. petrol or diesel. The gas tank arrangement 100 will be described in further detail below in relation to the description of FIGS. 2 and 3. For simplicity of understanding, the combustible gas will in the following be referred to as natural gas, either in a liquid phase i.e. a liquid/liquefied natural gas, or in a gas phase. The natural gas can be a compressed natural gas. The vehicle 1 depicted in FIG. 1 is a heavy duty vehicle, here in the form of a truck, for which the inventive gas tank arrangement 100 is particularly suitable for.

Figure 2:
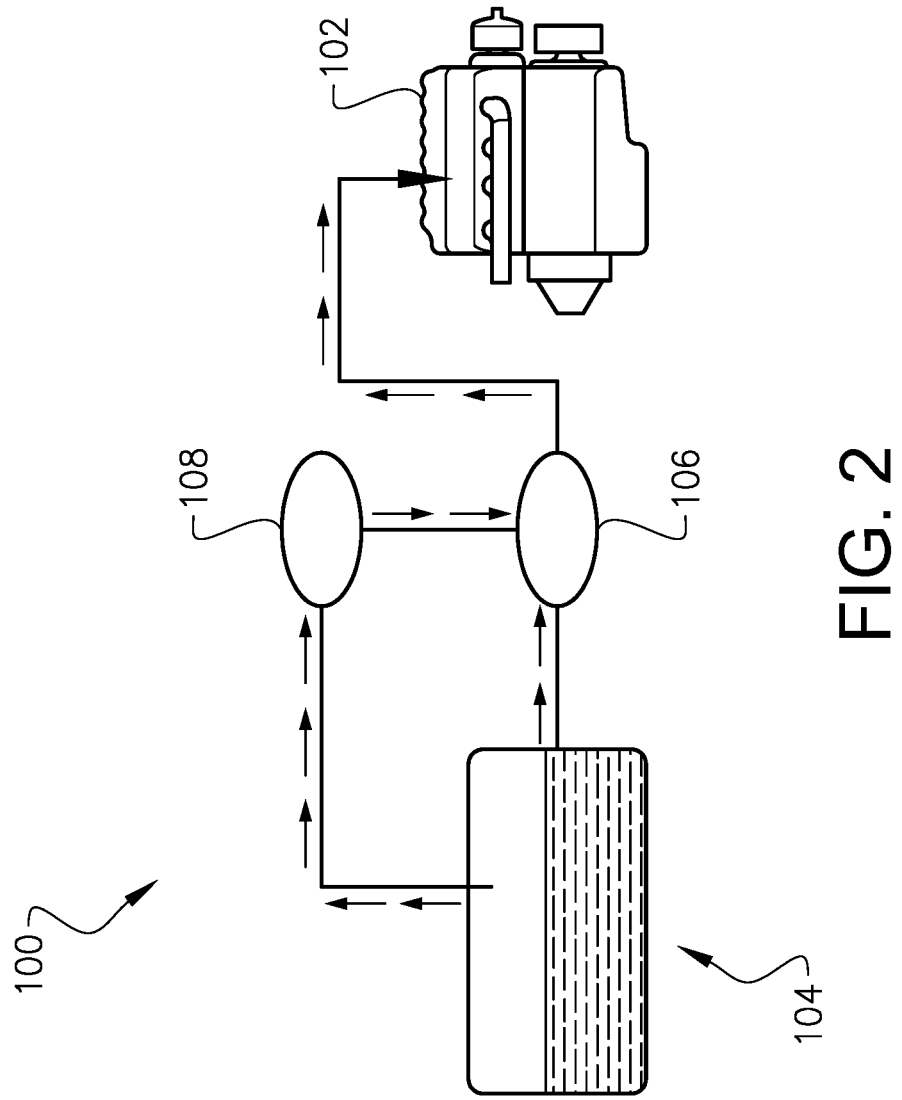
FIG. 2 is a schematic view illustrating an example embodiment of the gas tank arrangement according to the present invention.

Now, with reference to FIG. 2 an example embodiment of the gas tank arrangement 100 according to the present invention is depicted. The gas tank arrangement 100 comprises a gas tank 104 containing the natural gas. The natural gas is in a liquid phase in the lower portions of the gas tank 104 and in gas phase at the upper portion of the gas tank 104. Further, the gas tank 104 is preferably a gas tank pressure vessel arranged to store a slightly compressed natural gas. As a non-limiting example, the gas tank may be pressurized between 0-16 bar.

Furthermore, the gas tank arrangement 100 comprises a first additional gas tank 106 connected to the gas tank 104. In detail, the first additional gas tank 106 is arranged in downstream fluid communication with the gas tank 104. Still further, the first additional gas tank 106 is arranged in upstream fluid communication with the internal combustion engine 102 of the vehicle 1. Preferably, the first additional gas tank 106 is arranged in upstream fluid communication with inlet valves 128 (see FIG. 3) of the internal combustion engine 102.

Moreover, the gas tank arrangement 100 comprises a second additional gas tank 108. The second additional gas tank 108 is arranged in downstream fluid communication with the gas tank 104. In detail, the second additional gas tank 108 is connected to an upper portion of the gas tank 104 for receiving natural gas in gas phase from the gas tank 104. Further, the second additional gas tank 108 is also arranged in upstream fluid communication with the first additional gas tank 106.

During operation of the vehicle 1, natural gas is provided in the gas tank 104. The natural gas is in both liquid phase as well as in gas phase. Natural gas is delivered from the gas tank 104 to the first additional gas tank 106 and thereafter delivered to the internal combustion engine 102, or more precisely to the inlet valves 128 (see FIG. 3) of the internal combustion engine 102 for combustion therein.

However, when the vehicle operator, for example, intends to refuel the gas tank 104, there might be a desire to reduce the gas pressure of the gas tank 104. This is desirable in order to be able optimize the amount of liquid natural gas provided into the gas tank 104. Accordingly, by reducing the gas pressure in the gas tank 104, i.e. to vent the gas tank 104, it is possible to fill up the gas tank 104 with more gaseous fuel in comparison to a non-vented gas tank 104. It also enables for an increased fill speed of the gas tank 104. There are other situations when there is a desire to reduce the gas pressure in the gas tank 104. For example, if the vehicle 1 has been standing still for a few days and the gas pressure in the gas tank 104 has increased to critical limits. In these situations, natural gas in gas phase can be delivered from the gas tank 104 to the second additional gas tank 108. Hereby, the pressure level of the gas tank 104 is reduced while simultaneously keeping the vented natural gas within the gas tank arrangement 100. The natural gas contained in the second additional gas tank 108 can thereafter be controllably delivered to the first additional gas tank 106 before being combusted in the internal combustion engine 102. The natural gas can be delivered from the second additional gas tank 108 to the first additional gas tank 106 when there is sufficient space in the first additional gas tank 106 to receive further natural gas, or when the pressure level of the second additional gas tank 108 increases to critical levels where the second additional gas tank 108 is in need of ventilation in order to reduce the gas pressure therein.

Figure 3:
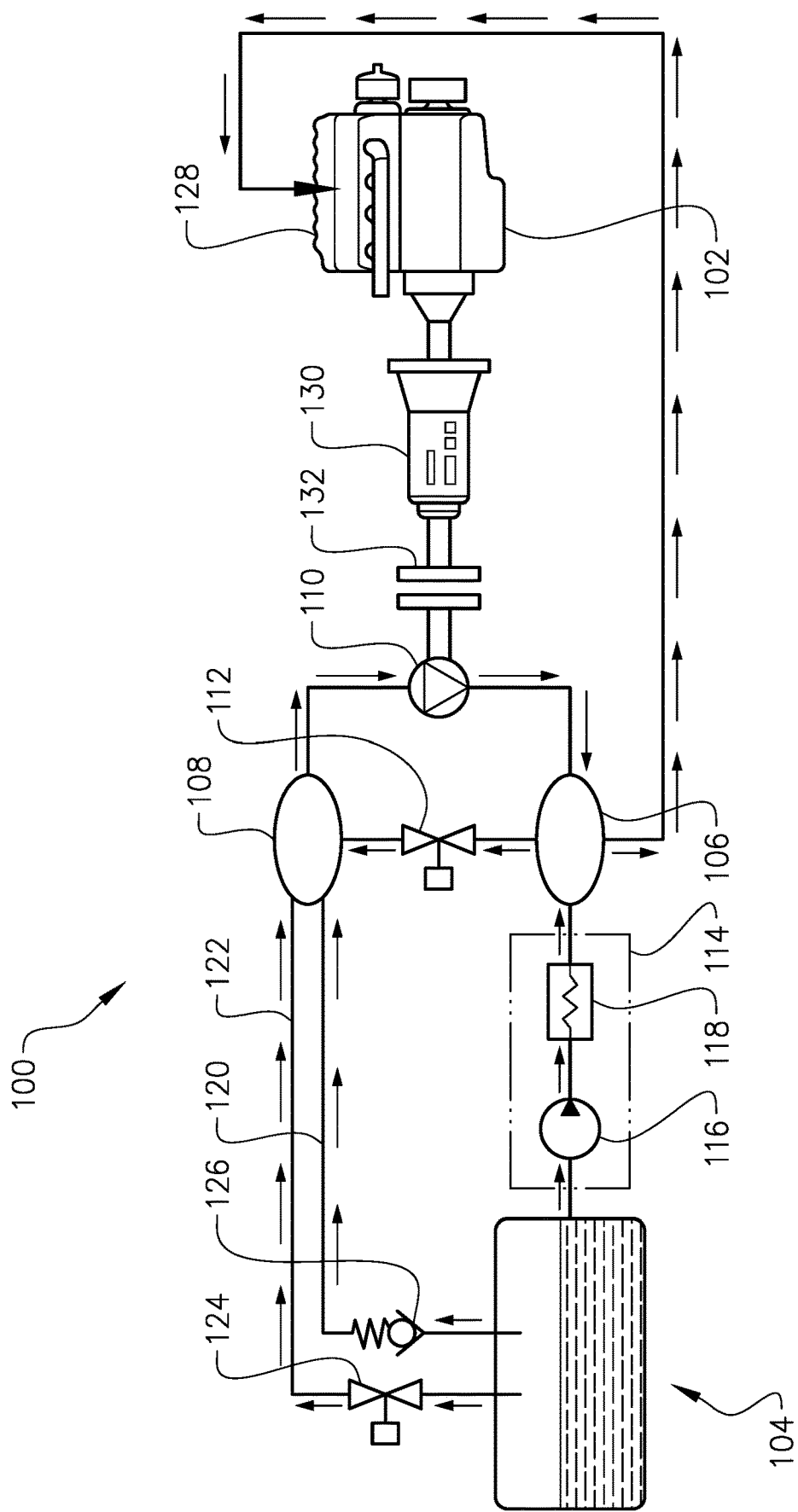
FIG. 3 is a schematic view illustrating a further example embodiment of the gas tank arrangement according to the present invention.

Now, with reference to FIG. 3 an example embodiment of the gas tank arrangement 100 according to the present invention is depicted. The embodiment depicted in FIG. 3 comprises the features described above in relation to FIG. 2. The embodiment in FIG. 3 also comprises further detailed example features that may be included in the gas tank arrangement 100, which will be described in detail below.

The gas tank arrangement 100 in FIG. 3 comprises a gas converter arrangement 114 arranged in fluid communication between the gas tank 104 and the first additional gas tank 106. Hence, the gas converter arrangement 114 is arranged downstream the gas tank 104 and upstream the first additional gas tank 106. The gas converter arrangement 114 is configured to transport the liquefied natural gas from the gas tank 104 and to compress and convert the liquefied natural gas from the gas tank 104 into compressed natural gas in gas phase. Hence, high-pressure natural gas in gas phase is provided into the first additional gas tank 106 from the gas tank 104. The gas converter arrangement 114 comprises, in the embodiment depicted in FIG. 3, a fuel pump 116 and an evaporating unit 118 positioned downstream the fuel pump 116. It is thus the fuel pump 116 that transports/delivers the liquefied natural gas from the gas tank 104 towards the first additional gas tank 106. The evaporating unit 118 pressurizes the liquefied natural gas and converts it into pressurized natural gas in gas phase. The present invention should however not be construed as limited to a fuel pump 116 for transportation of liquefied natural gas, other arrangements may also be used, such as e.g. a compressor, etc. Further, the fuel pump 116 may also be arranged as a fuel suction arrangement which sucks liquefied natural gas from the gas tank 104 and pushes the liquefied natural gas into the conduit towards the first additional gas tank 106. Also, the evaporating unit 118 may instead be arranged in upstream fluid communication with the fuel pump 116 such that the liquefied natural gas is compressed and converted into natural gas in gas phase before being delivered to the fuel pump 116.

The first additional gas tank 106 is, as described above in relation to FIG. 2, arranged in upstream fluid communication with the inlet valves 128 of the internal combustion engine 102.

Furthermore, the gas tank arrangement 100 comprises a first 120 and a second 122 conduit between the gas tank 104 and the second additional gas tank 108. The first 120 and second 122 conduits are hence arranged to deliver natural gas from the gas tank 104 to the second additional gas tank 108. In the example embodiment depicted in FIG. 3, the first conduit 120 comprises a pressure relief valve 126 in fluid communication between the gas tank 104 and the second additional gas tank 108, and the second conduit 122 comprises an electrically controlled valve 124 in fluid communication between the gas tank 104 and the second additional gas tank 108.

The pressure relief valve 126 is arranged to be positioned in an open state when the pressure level in the gas tank 104 exceeds a predetermined threshold limit. According to a non-limiting example, the pressure relief valve may have an opening pressure level of e.g. 16 bar if the gas pressure level in the gas tank 104 is up to 16 bar. Hence, when the pressure level of the gas tank 104 exceeds the predetermined maximum allowable pressure limit, the pressure relief valve 126 is positioned in the opened state to allow natural gas to flow from the gas tank 104 to the second additional gas tank 108. Hereby, the gas tank 104 is vented and the pressure level in the gas tank 104 is reduced.

The electrically controlled valve 124 on the other hand is arranged to be positioned in an opened state or in a closed state in response to a control signal indicating such mode of operation of the electrically controlled valve 124. Hereby, the operator of the vehicle may, for example, control the electrically control 124 valve to be positioned in an opened state before refueling the gas tank 104. This will reduce the pressure level of the gas tank 104 for optimizing the supply of natural gas from e.g. the gas station.

Natural gas in gas phase is thus delivered from the gas tank 104 to the second additional gas tank 108 via either or both of the first 120 and second 122 conduits. In the example depicted in FIG. 3, no compressor or fuel pump is provided between the gas tank 104 and the second additional gas tank 108. The pressure level of the natural gas contained in the second additional gas tank 108 is therefore approximately equal to the pressure level of the natural gas contained in the gas tank 104. According to a non-limiting example, the pressure level of the second additional gas tank 108 may be between 0-15 bar.

Still further, the gas tank arrangement 100 comprises a compressor 110 in fluid communication between the second additional gas tank 108 and the first additional gas tank 106. Hence, natural gas contained in the second additional gas tank 108 is provided into the first additional gas tank 106 via the compressor 110. The compressor 110 is arranged to compress the natural gas delivered from the second additional gas tank 108 such that high-pressure natural gas is delivered to the first additional gas tank 106. It should be readily understood that any arrangement which is able to compress gas into a relatively high-pressure gas can be used as an alternative to the compressor 110. The pressure level of the natural gas contained in the first additional gas tank 106 is thus higher than the pressure level of the natural gas contained in the gas tank 104 and the second additional gas tank 108. The natural gas contained in the first additional gas tank 106 preferably has a pressure level suitable to deliver to the inlet valves 128 of the internal combustion engine 102. As a non-limiting example, the pressure level of the first additional gas tank 106 may be between 15-250 bar for a dual fuel internal combustion engine, and between 15-600 bar for a single fuel engine Otto motor. Other ranges are of also conceivable. The compressed natural gas contained in the first additional gas tank 106 must not necessarily be delivered directly to the inlet valves 128 of the internal combustion engine 102. Rather, the compressed natural gas can equally as well be delivered to the inlet valves 128 via an injector (not shown) of the internal combustion engine or e.g. a pump. The first additional gas tank 106 may thus be formed as a gas pressure vessel.

Moreover, the compressor 110 depicted in FIG. 3 is mechanically connected to a gearbox 130 of the vehicle 1 via a clutch arrangement 132. The mechanically controlled compressor 110 may be connected to an engine power take off or a gearbox power take off. The gearbox 130 is in turn connected to the internal combustion engine 102 in a normal fashion. Hereby, the compressor 110 can be controllably propelled by the gearbox 130 and the internal combustion engine 102 by positioning the clutch arrangement 132 in an opened or closed state. The mechanically controlled compressor 110 can thus be propelled by energy generated during braking of the vehicle 1. A mechanically controlled compressor 110 has a relatively high degree of efficiency and can be used instead of using a retarder of the vehicle 1. Hence, by using a mechanically controlled compressor 110, the need of a retarder for the vehicle 1 may be reduced. As an alternative the compressor 110 may instead be an electrically controlled compressor. In such case, the compressor must not be connected to the gearbox 130 or the internal combustion engine 102.

Furthermore, the gas tank arrangement 100 may also comprise an electrically controlled compressor in addition to the mechanically controlled compressor 110. Hereby, the electrically controlled compressor can be utilized in situations when the mechanically controlled compressor 110 is unable to operate. The electrically controlled compressor is in such embodiment arranged in parallel with the mechanically controlled compressor 110. Still further, the electrically controlled compressor can be used when, for example, the second additional gas tank 108 is full and there is thus a need to deliver gas from the second additional gas tank 108 to the first additional gas tank 106. Other alternatives compared to a mechanically or electrically controlled compressor are also conceivable, such as e.g. hydraulically or pneumatically controlled compressors, etc.

Although FIG. 3 depicts the compressor 110 between the first 106 and second 108 additional gas tanks, it should be understood that the present invention may also function with a compressor 110 positioned in fluid communication between the gas tank 104 and the second additional gas tank 108. The second additional gas tank 108 is in such case a high-pressure gas tank containing natural gas with a pressure level substantially corresponding to the pressure level of the natural gas contained in the first additional gas tank 106. In such case, there might be a desire to be able to vent gas from the gas tank 104 to the ambient environment via, for example, a pressure relief valve (not shown).

Moreover, the gas tank arrangement 100 further comprises a valve 112 positioned in fluid communication between the first additional gas tank 106 and the second additional gas tank 108. In detail, the valve 112 is arranged in downstream fluid communication with the first additional gas tank 106 and arranged in upstream fluid communication with the second additional gas tank 108. The valve 112 is depicted as an electrically controlled valve but could equally as well be another type of valve, such as e.g. a pressure relief valve.

In cases when the pressure level of the first additional gas tank 106 exceeds a maximum allowable threshold limit, the valve 112 can be arranged in an open state to vent the first additional gas tank 106 and allow natural gas to be delivered from the first additional gas tank 106 to the second additional gas tank 108. The valve 112 is hence arranged in a conduit separate from a conduit comprising the compressor 110.

It is to be understood that the present invention is not limited to the embodiments described above and illustrated in the drawings; rather, the skilled person will recognize that many changes and modifications may be made within the scope of the appended claims. For example, the gas tank arrangement 100 may comprise a single conduit in fluid communication between the gas tank 104 and the second additional gas tank 108, which single conduit may comprise either one of the electrically controlled valve 124 or the pressure relief valve 126.

The invention claimed is:

1. A gas tank arrangement connectable to an internal combustion engine, the gas tank arrangement comprising a gas tank configured to contain a combustible gas and comprising a first outlet and a second outlet, a first additional gas tank positioned in downstream fluid communication with the first outlet of the gas tank to receive gas in liquid phase therefrom, and a second additional gas tank positioned in downstream fluid communication with the second outlet of the gas tank to receive gas in gas phase therefrom and in upstream fluid communication with the first additional gas tank, wherein the first additional gas tank is a high pressure gas vessel configured to contain compressed combustible gas adapted to, when the gas tank arrangement is connected to the internal combustion engine, be delivered to a fuel injection system of the internal combustion engine.

2. The gas tank arrangement according to claim 1, wherein the first additional gas tank is configured to, when the gas tank arrangement is connected to the internal combustion engine, be positioned in upstream fluid communication with the internal combustion engine.

3. The gas tank arrangement according to claim 1, wherein the gas tank arrangement comprises a compressor positioned in fluid communication between the first and second additional gas tanks.

4. The gas tank arrangement according to claim 3, wherein the compressor is a mechanically driven gas compressor connectable to the internal combustion engine.

5. The gas tank arrangement according to claim 3, wherein the compressor is an electrically driven gas compressor.

6. The gas tank arrangement according to claim 1, wherein the gas tank arrangement further comprises a valve positioned in fluid communication between the first and second additional gas tanks, wherein the first additional gas tank is positioned in upstream fluid communication with the second additional gas tank via the valve.

7. The gas tank arrangement according to claim 1, wherein the gas tank arrangement comprises a gas converter arrangement arranged to convert liquefied combustible gas to compressed combustible gas, the gas converter arrangement being positioned in fluid communication between the gas tank and the first additional gas tank.

8. The gas tank arrangement according to claim 7, wherein the gas converter arrangement comprises a fuel pump and an evaporating unit positioned in downstream fluid communication with the fuel pump.

9. The gas tank arrangement according to claim 1, wherein the gas tank arrangement comprises a first conduit arranged between the gas tank and the second additional gas tank.

10. The gas tank arrangement according to claim 9, wherein the gas tank arrangement comprises a pressure relief valve arranged in the first conduit between the gas tank and the second additional gas tank.

11. The gas tank arrangement according to claim 1, wherein the gas tank arrangement comprises a second conduit arranged between the gas tank and the second additional gas tank.

12. The gas tank arrangement according to claim 11, wherein the gas tank arrangement comprises an electrically controlled valve arranged in the second conduit between the gas tank and the second additional gas tank.

13. The gas tank arrangement according to claim 1, wherein the gas tank and the second additional gas tank are configured to contain combustible gas of similar pressure levels.

14. The gas tank arrangement according to claim 1, wherein the combustible gas is natural gas.

15. A vehicle comprising an internal combustion engine and the gas tank arrangement according to claim 1, wherein the internal combustion engine is arranged downstream from the gas tank arrangement.

16. The vehicle according to claim 15, wherein the internal combustion engine is a dual fuel internal combustion engine.

17. The gas tank arrangement according to claim 1, wherein the second outlet of the gas tank is positioned above the first outlet of the gas tank.

* * * * *